Figure 1:
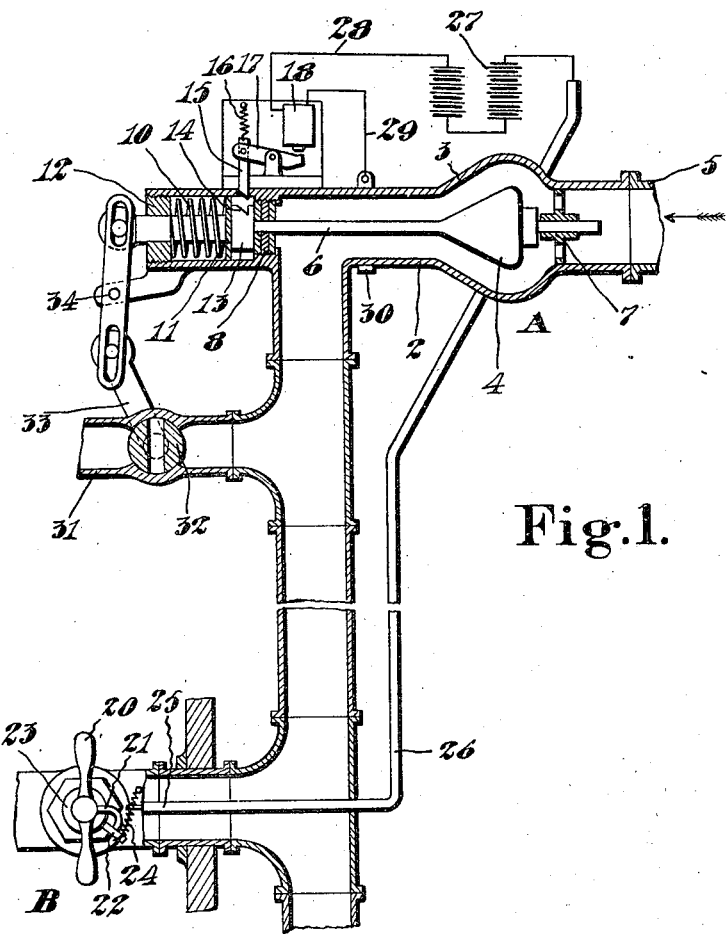

Dec. 2, 1924.

O. L. ELY

AUTOMATIC SHUT-OFF

Filed April 2, 1921

1,517,894

INVENTOR
Oscar L. Ely.
By his attorney,
J. H. McCurdy

Patented Dec. 2, 1924.

1,517,894

UNITED STATES PATENT OFFICE.

OSCAR L. ELY, OF BEVERLY, MASSACHUSETTS.

AUTOMATIC SHUT-OFF.

Application filed April 2, 1921. Serial No. 458,070.

*To all whom it may concern:*

Be it known that I, OSCAR L. ELY, a citizen of the United States, residing at Beverly, in the county of Essex and State of Massachusetts, have invented certain new and useful Improvements in Automatic Shut-Offs, of which the following is a specification.

This invention involves an apparatus for automatically shutting off the flow of fluid through a pipe or other conducting element upon the bursting of the pipe, or under other circumstances in which an abnormal flow occurs. It is the chief object of the invention to devise an apparatus which will be applicable to a wide variety of uses, which will be reliable in operation, economical to manufacture, and which can be conveniently installed.

The nature of the invention will be readily understood from the following description when read in connection with the accompanying drawings, and the novel features will be particularly pointed out in the appended claims.

Figure 2:
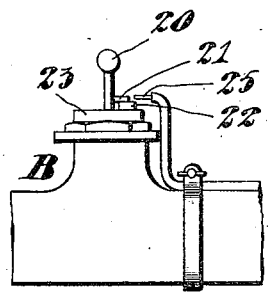

Referring now to the drawings,

Figure 1 is a somewhat diagrammatic view illustrating an apparatus embodying the present invention; and Fig. 2 is a side elevation of a portion of one of the elements of the apparatus shown in Fig. 1.

The drawings show the invention applied to a water supply system similar to that used for domestic purposes, although the invention is equally applicable to steam and gas supply systems, ammonia plants, and the like. The construction shown comprises an emergency or safety valve indicated in general at A, a service valve indicated at B, and connections between these valves whereby the service valve controls the safety valve.

The safety valve comprises a casing or fitting 2 having a tapered seat 3 to receive a plug or plunger 4. This casing is connected with a main supply pipe 5, usually at a point close to its entrance to the building or plant. The valve plunger 4 is mounted on a stem 6 which extends longitudinally through the casing 2 and is guided in a spider 7 at one end of the plug and in a stuffing box 8 at the opposite end. The plunger 4 preferably has a conical shape, as shown, the base of the cone being presented to the incoming current of fluid entering the casing from the supply pipe 5. Consequently, the flow of water through this pipe tends to seat the plunger 4. In order to prevent the accidental seating of the valve a light spring 10 is utilized to hold the valve plunger in its open position, this spring encircling an extension of the stem 6 and bearing at one end on a washer 11 and at its opposite end in a plug 12 which is threaded into the end of the casing 2. The washer rests against an enlargement 13 on this stem which is notched, as indicated at 14, to receive a latch 15. This latch normally is held in its retracted position by a spring 16, and it may be moved in opposition to this spring by a lever 17 which is pivotally connected at one end to the latch and has its opposite end mounted within the field of force of an electro-magnet 18.

Normally the spring 16 holds the latch 15 in the position in which it is shown in Fig. 1, and so long as the device is in this condition the plunger 4 is free to close whenever any substantial flow occurs through the casing 2. For the purpose of preventing this valve from closing under the influence of a normal flow through the casing, connections are provided for placing this valve under the control of the service valve B.

The service valve is connected in series with the safety valve and it may be of any suitable type but is shown as having a handle 20 which is rotated to open or close the valve. The stem of this handle carries a small finger 21 which is adapted to engage, at certain times, with a contact 22 mounted on a washer 23 that is seated on the upper side of the valve casing. A spring 24 tends, however, to hold the contact 22 in engagement with a stationary contact 25 which is connected by an electrical conductor housed in the conduit 26 with one terminal of a battery, or other source of electricity, 27. The opposite terminal of this battery is connected by a conductor 28 with one terminal of the solenoid 18, and the other terminal of the solenoid is connected through the wire 29 and clamp 30 to the pipe. The parts 22 and 25 thus constitute a switch controlling the flow of current through the solenoid 18.

So long as the valve B remains closed it holds this switch open, but when the handle 20 of the service valve is turned to open the valve the first part of this turning movement carries the finger 21 away from the contact 22, thus allowing the spring 24 to swing this contact into engagement with its cooperating contact 25. This completes the circuit through the solenoid 18 which immediately moves the latch 15 down into the notch 14 and thereby locks the plunger 4 of the safety valve in its open position. Consequently, so long as the service valve is held open the safety valve or emergency valve will be held in its open position, and the normal operation of the system therefore will not be interfered with. If, however, a pipe should burst or be broken while the service valve is closed, the flow of water through the casing 2 would seat the plunger 4 immediately, thus effectually cutting off any further flow through the pipe, and the plunger would be held in its closed position by the pressure of the fluid behind it.

Usually a series of service valves are used in the system, each of said valves being in series with the safety valve A and each being equipped with a switch like that with which the valve B is provided, and these switches being connected to the conductor 26 so that each of these service valves exercises the same control over the safety valve as that above described in connection with the valve B.

The invention also provides for automatically draining the system upon the operation of the safety valve. For this purpose a drain valve or cock 31 is connected with the pipe by a suitable T, and the plug 32 of this valve has an arm 33 secured thereto which is connected by a link 34 with the outer end of the valve stem 6.

It will be evident from an inspection of Fig. 1 that when the valve plunger 4 is moved to the left far enough to seat the valve, this movement will be transmitted through the lever 34 to the plug 32, thus turning this plug into its open position and thereby allowing the fluid in the pipe on the low pressure side of the safety valve to drain out. This valve, of course, is connected with the sewer or some other suitable discharge conduit or receptacle.

It will now be evident that this invention provides a very simple form of safety apparatus which can be cheaply and economically installed, and which, while requiring no attention in the normal use of the system, will, nevertheless, operate automatically to cut off any flow of fluid which may occur due to a broken pipe or the like. Moreover, if desired, the apparatus can be equipped with the draining attachment above described which will serve to drain the section of pipe in which the break has occurred.

What is claimed as new is:

1. An apparatus of the character described comprising, in combination, a fluid conducting pipe, a service valve and an emergency valve connected in series in said pipe, and electrical connections under control of said service valve for maintaining the emergency valve in its open position when the service valve is open, but permitting the emergency valve to operate when the service valve is closed.

2. An apparatus of the character described comprising, in combination, a fluid conducting pipe, a service valve and an emergency valve connected in series in said pipe, connections whereby said service valve controls the operation of said emergency valve when the service valve is in its open position, and a drain valve connected with said emergency valve to be operated thereby.

OSCAR L. ELY.